US007447352B2

(12) United States Patent
Kim

(10) Patent No.: US 7,447,352 B2
(45) Date of Patent: Nov. 4, 2008

(54) METHOD FOR ABSTRACTING HISTOGRAM OF HSV COLOR

(75) Inventor: Yong Sung Kim, Seoul (KR)

(73) Assignee: Konan Technology, Seoul (KR)

( * ) Notice: Subject to any disclaimer, the term of this patent is extended or adjusted under 35 U.S.C. 154(b) by 460 days.

(21) Appl. No.: 10/514,528

(22) PCT Filed: May 20, 2002

(86) PCT No.: PCT/KR02/00950

§ 371 (c)(1),
(2), (4) Date: May 6, 2005

(87) PCT Pub. No.: WO03/098550

PCT Pub. Date: Nov. 27, 2003

(65) Prior Publication Data

US 2006/0034510 A1 Feb. 16, 2006

(51) Int. Cl.
G06K 9/00 (2006.01)
H04N 1/46 (2006.01)
H04N 7/01 (2006.01)
G09G 5/02 (2006.01)
(52) U.S. Cl. .................. 382/162; 386/42; 358/515; 348/450; 348/663; 345/604
(58) Field of Classification Search ......... 382/162–172; 345/589–605; 348/254–256, 441, 450, 453, 348/575–577, 630–631, 642–645, 649–651, 348/661–663, 671–675; 358/500, 515–522; 386/42–44
See application file for complete search history.

(56) References Cited

U.S. PATENT DOCUMENTS 2,953,633 A * 9/1960 Hughes .................. 386/42

(Continued)

FOREIGN PATENT DOCUMENTS

KR    1999/81410    11/1999

(Continued)

OTHER PUBLICATIONS

Swenson, R.L.; Dimond, K.R., "A real-time colour transformation architecture," High Performance Architectures for Real-Time Image Processing (Ref. No. 1998/97), IEE Colloquium on , vol., No., pp. 13/1-13/6, Feb. 12, 1998.*

(Continued)

Primary Examiner—Bhavesh Mehta
Assistant Examiner—Manav Seth
(74) Attorney, Agent, or Firm—Workman Nydegger

(57) ABSTRACT

A method Abstract a histogram of HSV (Hue-Saturation-Value) colors from a color signal. The method includes receiving the color signal having a luminance component (Y) and chrominance components (CbCr). One section of a lookup table is selected according to the luminance component (Y) of the received color signal. The lookup table is divided into a plurality of sections each storing quantizing index values. Each section is divided by concentric circles corresponding to quantizing boundaries of the Saturation from a center, and divided by radial lines. Corresponding quantizing index values are selected according to the chrominance components (CbCr) of the received color signal in the selected section. The histogram index of the HSV colors is abstracted with reference to the selected section and the quantizing index values selected in the selected section.

4 Claims, 3 Drawing Sheets

U.S. PATENT DOCUMENTS

| | | | | |
|---|---|---|---|---|
| 4,500,919 A | * | 2/1985 | Schreiber | 358/518 |
| 4,500,972 A | * | 2/1985 | Kuhn et al. | 382/167 |
| 4,984,072 A | * | 1/1991 | Sandrew | 348/34 |
| 5,296,920 A | * | 3/1994 | Sakaue et al. | 348/675 |
| 5,710,824 A | * | 1/1998 | Mongeon | 382/162 |
| 5,917,987 A | * | 6/1999 | Neyman | 386/42 |
| 6,249,602 B1 | * | 6/2001 | Michael et al. | 382/168 |
| 6,292,617 B1 | * | 9/2001 | Neyman | 386/42 |
| 6,522,779 B2 | * | 2/2003 | Pass et al. | 382/170 |
| 6,801,649 B1 | * | 10/2004 | Michael et al. | 382/142 |

FOREIGN PATENT DOCUMENTS

| | | |
|---|---|---|
| KR | 2001/17515 | 3/2001 |
| KR | 2001/54460 | 7/2001 |
| KR | 2002/74570 | 10/2002 |

OTHER PUBLICATIONS

Tools and techniques for color image retrieval, John R. Smith and S.-F. Chang, Proc. SPIE Int. Soc. Opt. Eng. 2670, 426 (1996).*

U.S. Appl. No. 10/514,526 entitled "Scene Change Detector Algorithm in Image Sequence," filed Nov. 11, 2004.

U.S. Appl. No. 10/514,527 entitled "Method for Detecting Face Region Using Nueral Network," filed Nov. 15, 2004.

* cited by examiner

METHOD FOR ABSTRACTING HISTOGRAM OF HSV COLOR

TECHNICAL FIELD

The present invention relates to a method for abstracting a histogram of HSV colors, and more particularly, to a method for fast abstraction of a histogram of HSV colors from a still or motion picture stored in a YCbCr format.

BACKGROUND ART

Recently, as use of digital video increases rapidly, starting from video search by means of video indexing, or content basis search by using an image, development of a variety of multimedia service systems has been made. Most of content basis search systems by using images use a method in which proper characteristic vectors are abstracted from the images, and a similarity of the images are determined with reference to a similarity of the characteristic vectors. Of different image characteristics, an HSV (Hue-Saturation-Value) Color Histogram is used widely as the most typical image characteristic.

There are a variety of methods for expressing a color, by using different color models depending on application, such as RGB (Red, Green, and Blue; a color model for expressing a color with three primary color of red, green, and blue), CMY (Cyan, Magenta, and Yellow; a typical color model in a printing field), YCbCr (Gamma transformed luminance/color difference separation color model), HSV (typical color model used in a Computer Graphic field), and the like.

Of the different color models, the YCbCr color model, very efficient in compressing a picture data, is used in most of picture compressing international standards, such as JPEG (Joint Photographic Coding Experts Group), MPEG (Moving Picture Experts Group), and the like. The YCbCr color model indicates ratios of three components of luminance information 'Y', color difference information 'Cb', and 'Cr' included in a horizontal line of a TV screen and the like, wherein the luminance of a pixel is represented with 8 bits, and the color of the pixel is represented with the color difference information by using two 8 bits.

However, since the YCbCr color model is far from human perception characteristics, the HSV color model, which reflects the human perception characteristics the best, is mostly used in abstracting the characteristic vectors from the picture. That is, a YCbCr color space is converted into an HSV color space of a Hue, Saturation, and Value before using the YCbCr color.

FIG. 1 illustrates a block diagram of a related art HSV color histogram abstractor.

The related art HSV color histogram abstractor, for abstracting a HSV color histogram from the YCbCr color model, is provided with a YCbCr/HSV converter 101 for converting a pixel value from the YCbCr color model to the HSV color model, a quantizer 102 for quantizing the HSV color model converted at the YCbCr/HSV converter 101 to provide a histogram index, and a histogram generator 103 for increasing a histogram BIN value of the histogram index from the quantizer 102 by one, to generate a histogram.

A related art method for abstracting an HSV color histogram from the YCbCr color model will be described.

For abstracting the HSV color histogram from the picture stored in the YCbCr color model, the YCbCr/HSV converter 101 converts a pixel value from the YCbCr color model to the HSV color model with the following equations.

$$H = \tan^{-1} \frac{Cr\text{-}128}{Cr\text{-}128} S \frac{180}{\pi} - 180, 0D\ HD\ 360 \quad (1)$$

$$S = \sqrt{(Cr\text{-}128)^2 + (Cb\text{-}128)^2}, 0D\ SD\ 128 \quad (2)$$

$$V = Y, 0 \le V \le 255 \quad (3)$$

Then, the quantizer 102 quantizes the pixel value of the HSV model, to obtain a histogram index. As an example of an actual quantization which can be used effectively in the content basis image search application, a case of quantization as shown in FIG. 3 will be described.

Referring to FIG. 3A, the HSV model is represent with a three dimensional (HSV) cylindrical coordinate system, in which an axis of the cylinder represents 'V', a concentric circular direction starting from a center (0) represents 'S', and an angle represents 'H'. A method for quantizing the three dimensional HSV space represented thus is illustrated in sections of an HS plane and an SV plane.

That is, a pixel, having an 'S' equal to or smaller than 5, is regarded as a gray scale, and quantized only with respect to 'V' in four stages each with 64 levels regardless of an H value. A color, having the 'S' greater than 5 and equal to or smaller than 30, is quantized with respect to 'H' in six stages each with 60 degrees, and 'V' in two stage each with 128 levels. A color, having the 'S' greater than 30, is quantized only with respect to 'H' in six stages each with 60 degrees while disregarding 'V'.

A part having the S greater than 30 is quantized coarser than a part having the S smaller than 30 for reflecting a probability that occurrence of great S is relatively small in natural pictures. Thus, a histogram having 22 BINs (four stages with respect to 'V' for a pixel having S smaller than 5, six stages with respect to 'H' and two stage with respect to 'V' (2×6) for a color having an S greater than 5 and smaller than 30, and six stages with respect to 'H' for a color having an S greater than 30) is drawn up. The quantizer 102 determines a given pixel value of being a point belonging to which of 22 sections divided by circular, and radial boundaries in the three dimensional HSV space, and provides an index value between 0 to 21 representing the section. Every time the quantization index is obtained, the histogram generating part 103 increases a BIN value of the histogram for the index by one, to draw up the histogram.

However, the related art method for abstracting an HSV color histogram from a picture in the YCbCr color model has the following problems.

That is, even though the HSV color histogram is drawn up if the foregoing process is carried out for all pixels, the square root operation and the arctan function operation in the equations (1) and (2) for converting the YCbCr color model to the HSV color model costs very high.

DISCLOSURE OF INVENTION

An object of the present invention designed to solve the foregoing problem lies on providing a method for abstracting an HSV color histogram from a YCbCr format picture, not by using a related art method in which a picture stored in a YCbCr color model is converted into an HSV model, and the converted HSV color model is quantized in an HSV space, but by receiving the YCbCr color model in advance, making a Lookup table (LUT) which can provide a histogram index, and abstracting the HSV histogram with reference to the lookup table, for dispensing with the complicate operations.

The object of the present invention can be achieved by providing a method for abstracting a histogram of HSV colors, including the steps of drawing up lookup tables each divided into a plurality of sections each having a quantizing index value stored therein, for receiving a YCbCr and providing an HSV histogram index, selecting one section of the lookup table according to a Y signal and a CbCr signal of a YCbCr model, and abstracting the histogram with reference to the index of the selected section.

Preferably, in a case H, S, and V are respectively quantized in L, M, and N levels, the step of drawing up lookup tables includes the steps of drawing up N lookup tables corresponding to Cb and Cr, dividing each of the N lookup tables with M concentric circles corresponding to S quantizing boundaries from a center, dividing each of the N lookup tables with L radial lines to form sections, and storing a quantizing index in each of sections of the N lookup tables.

Preferably, a number of the lookup tables is four, each divided by concentric circles with 5, and 30 radii from the center respectively, and by six radial lines again for sections with a radius greater than 5, for storing quantizing indices therein respectively.

In another aspect of the present invention, there is provided a method for abstracting a histogram of HSV colors in a case H, S, and V are respectively quantized in L, M, and N levels, comprising the steps drawing up N lookup tables corresponding to Cb and Cr, dividing each of the N lookup tables with M concentric circles corresponding to S quantizing boundaries from a center, dividing each of the N lookup tables with L radial lines to form sections, storing a quantizing index in each of sections of the N lookup tables, shifting a luminance signal Y of received YCbCr to right by (8-log2N) bits when N is a power of 2, and dividing Y with N when N is not a power of 2, and selecting one of the N lookup tables, and picking up a value of a section corresponding to Cb and Cr.

BRIEF DESCRIPTION OF DRAWINGS

The accompanying drawings, which are included to provide a further understanding of the invention, illustrate embodiment(s) of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings. In describing the embodiments of the present invention, same parts will be given the same names and reference symbols, and repetitive description of which will be omitted.

A method for abstracting a histogram of HSV colors from a YCbCr format picture in accordance with a preferred embodiment of the present invention will be described with reference to the attached drawings.

Figure 1:
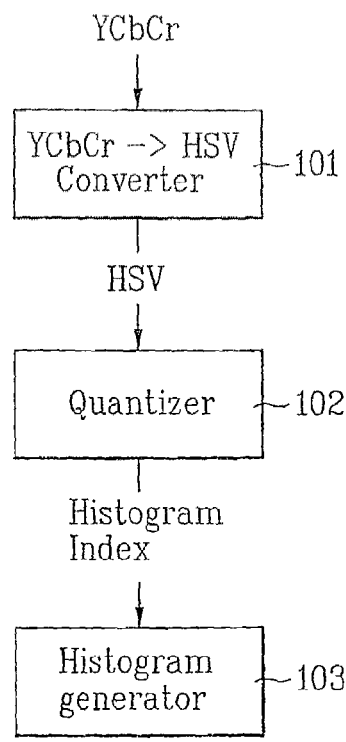
FIG. 1 illustrates a block diagram of abstracting an HSV color histogram from a YCbCr format picture in the related art.
Figure 2:
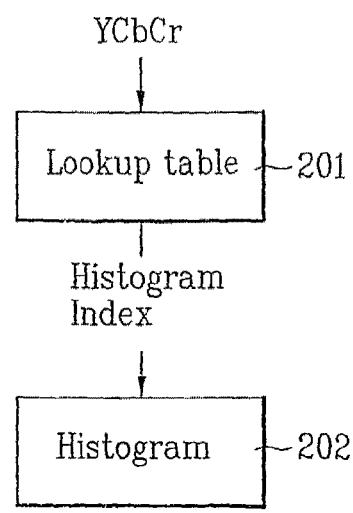
FIG. 2 illustrates a block diagram of abstracting an HSV color histogram from a YCbCr format picture in accordance with a preferred embodiment of the present invention.
Figure 3A:
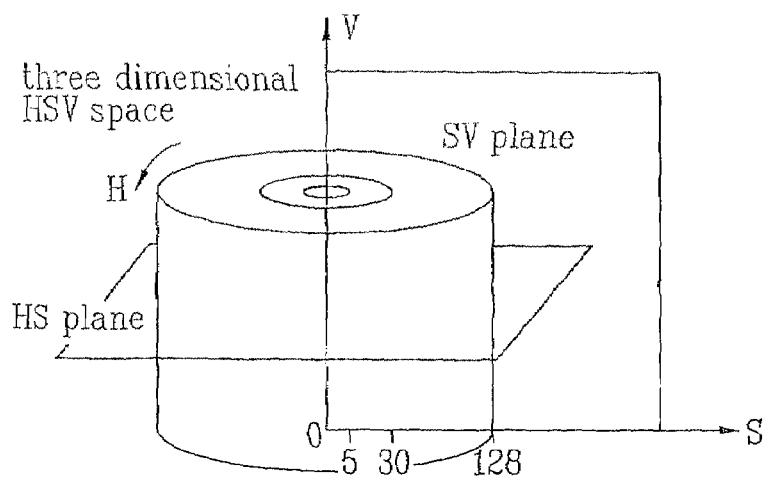
FIGS. 3A~3C illustrate an example of a quantizing method in an HSV space in accordance with the present invention.
Figure 3B:
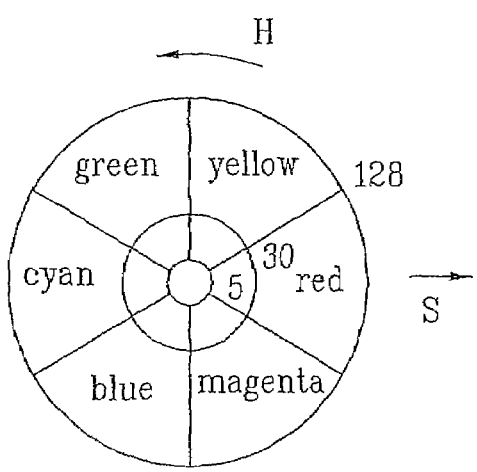

The system and operation of the present invention will be described taking a case of quantization as illustrated in FIG. 3 as an example.

Figure 4:
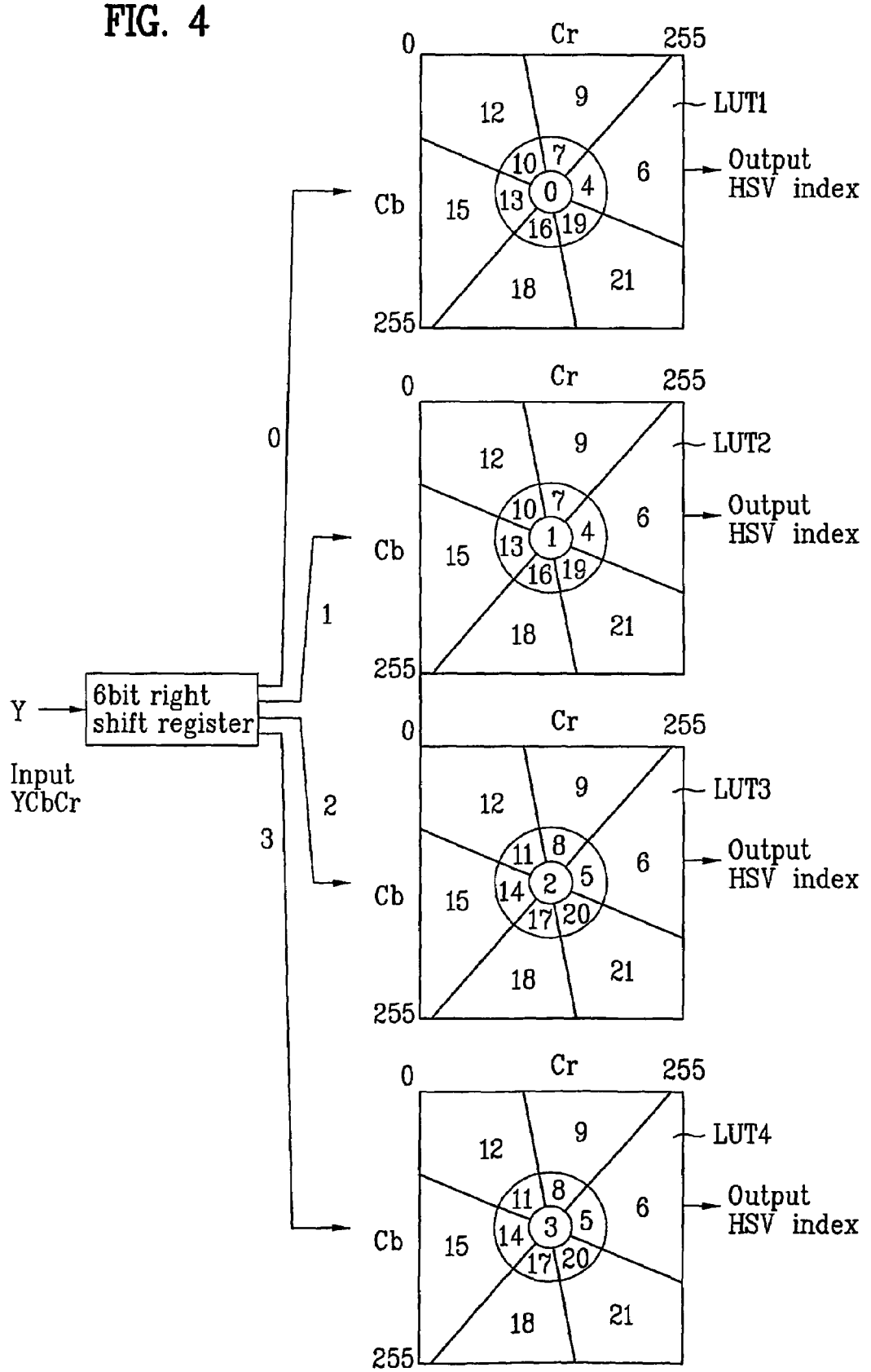
FIG. 4 illustrates an exemplary diagram for describing a method for making and referring to an LUT of the present invention.

Referring to FIG. 4, four lookup tables LUT1~LUT4 each with 256×256 height and width size in correspondence to Cb and Cr are drawn up in advance. Each of the lookup tables LUT1~LUT4 is divided by concentric circles with radii 5 and 30 from a center (0, 0), and six radial lines at 60° intervals starting from 138° for a section thereof outside of radius 5. The section is divided by six radial lines at 60° intervals starting from 138° because an 108° on a Cb, or Cr plane corresponds to 0° on an H plane, i.e., for dividing the lookup table into six sections at 60° intervals centered on 0° of an H plane, it is required to draw six radial lines at 60° intervals centered on 108°, resulting to obtain a section from 138° to 78°, which is 108°±30°, and divide the lookup table with radial lines at 60° intervals starting from 138°.

Referring to FIG. 4, a quantizing index value is stored in each section of the lookup table.

Figure 3C:
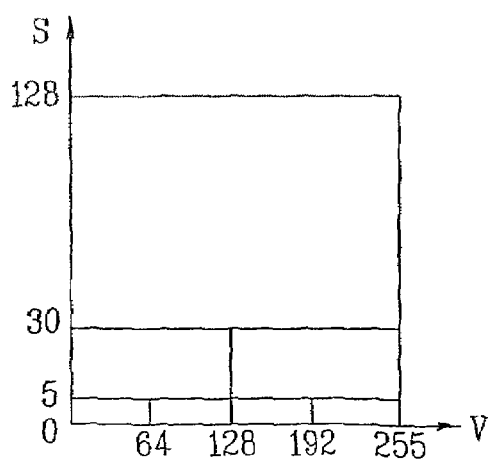

That is, referring to FIG. 3C, since the section with a radius below 5 on the SV plane is divided in four stages each with 64 levels, four lookup tables are drawn up, and different quantizing index values are respectively stored in the sections of the lookup tables with radii below 5 accordingly (a quantizing value of "0" is stored in LUT1, a quantizing value of "1" is stored in LUT2, a quantizing value of "2" is stored in LUT3, and a quantizing value of "3" is stored in LUT4).

Also, since a section having a radius greater than 5 but smaller than 30 on the SV plane is divided into two sections, though identical quantizing values are stored in sections of the first and second lookup tables LUT1 and LUT2 each with a radius greater than 5 but below 30, and identical quantizing values are stored in sections of the third and fourth lookup tables LUT3 and LUT4 each with a radius greater than 5 but below 30, different quantizing values are stored in sections of the first and second lookup tables LUT1 and LUT2, and the third and fourth lookup tables LUT3 and LUT4, each with a radius greater than 5 but below 30.

Also, since a section on the SV plane with a radius greater than 30 is not divided, identical quantizing values are stored in sections of the lookup tables each with a radius greater than 30.

A method for abstracting a histogram of HSV colors from the YCbCr color model of the present invention by using the lookup tables drawn up thus will be described.

When a pixel value of the YCbCr color model is provided, by shifting a luminance signal 'Y' to right, one of the four lookup tables is selected with reference to a value corresponding to the most significant two bits, where a value corresponding to Cb and Cr can be obtained, which is the quantizing index at the time converted into the HSV model and quantized.

The lookup tables drawn up thus can be summarized as follows.

In a case H, S, and V are respectively quantized in L, M, and N levels, after preparing a system in which 'N' lookup tables each with a 256×256 size corresponding to Cb and Cr are drawn up, so that one of N lookup tables is selected by shifting Y to right by (8-log2N) bits when N is a power of 2, and subjecting Y to an integer dividing operation with N when N is not a power of 2, and a value corresponding to Cb and Cr is picked up from the lookup table, and after dividing each of the lookup table with M concentric circles for a range starting from a 128 radius from a center of the lookup table to an 'S' radius quantizing boundaries, and with L radial lines at regular intervals, a quantizing index is stored in each section. Once the lookup tables are drawn up thus, the steps of converting the pixel value from the YCbCr space to the HSV space, and quantizing the pixel value in the HSV space can be replaced with only one step of referring to the lookup tables, that is very simple.

INDUSTRIAL APPLICABILITY

As has been described, the method for abstracting a histogram of HSV colors from a YCbCr format of the present invention has the following advantages.

In abstracting the HSV color histogram from a picture stored in a YCbCr model, by simplifying the steps of converting the YCbCr model to the HSV model, and quantizing the HSV model in the HSV space into one step of referring to the lookup tables, a speed of abstracting the histogram can be improved a few hundred times.

Moreover, the abstracting method of the present invention is useful not only in a case when an HSV color histogram is abstracted from a still picture stored in a format, such as JPEG, but also in a case a fast processing of a large amount of data, such as analyzing a large amount of digital video, such as an HDTV broadcasting stream.

What is claimed is:

1. A method for abstracting a histogram of HSV (Hue-Saturation-Value) colors from a color signal, comprising the steps of:
   receiving the color signal including a luminance component (Y) and chrominance components (CbCr);
   selecting one section of a lookup table according to the luminance component (Y) of the received color signal, wherein the lookup table being divided into a plurality of sections each storing quantizing index values, and wherein each section being divided by concentric circles corresponding to quantizing boundaries of the Saturation from a center, and divided by radial lines;
   selecting corresponding quantizing index values according to the chrominance components (CbCr) of the received color signal in the selected section; and
   abstracting the histogram index of the HSV colors with reference to the selected section and the quantizing index values selected in the selected section.

2. The method as claimed in claim 1, further comprising: in a case of respectively quantizing the HSV colors in L, M, and N levels, drawing up the lookup tables including N sections respectively having quantizing index values corresponding to Cb and Cr, wherein each section being divided by concentric circles with M corresponding to quantizing boundaries of the Saturation from a center, and divided by radial lines with L dividing each of the N lookup tables.

3. The method as claimed in claim 2, wherein the N is four, each section being divided by the concentric circles of 5 and 30 radii from the center respectively, and by six radial lines again for sections with a radius greater than 5, for storing quantizing indices in the divided parts respectively.

4. The method as claimed in claim 2, further comprising:
   drawing up N lookup tables corresponding to Cb and Cr;
   dividing each of the N lookup tables with M concentric circles corresponding to S quantizing boundaries from a center; dividing each of the N lookup tables with L radial lines to form sections;
   storing a quantizing index in each of sections of the N lookup tables;
   either shifting the luminance component (Y) of the received color signal to right by (8−log 2N) bits when the N is a power of 2 or dividing the luminance component (Y) with the N when the N is not a power of 2, and selecting one of the N sections; and
   picking up a value corresponding to the chrominance components (CbCr) in the selected section.

* * * * *